May 30, 1967
H. F. SNOW
3,322,173
APPARATUS FOR WASHING AND PEELING FRUITS AND VEGETABLES
Filed May 26, 1964
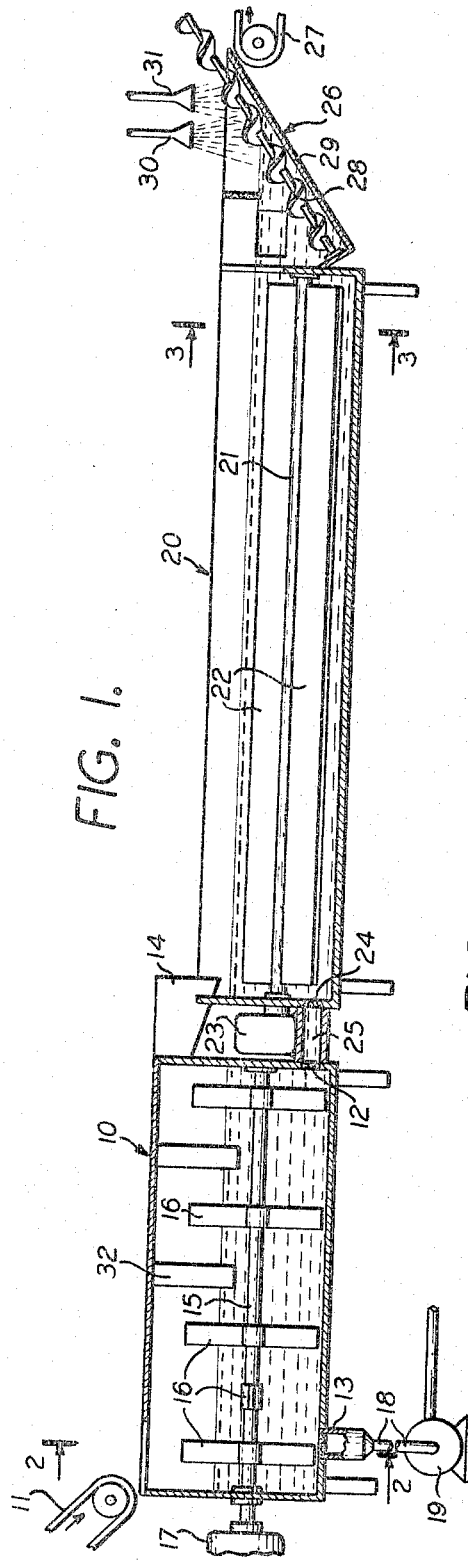
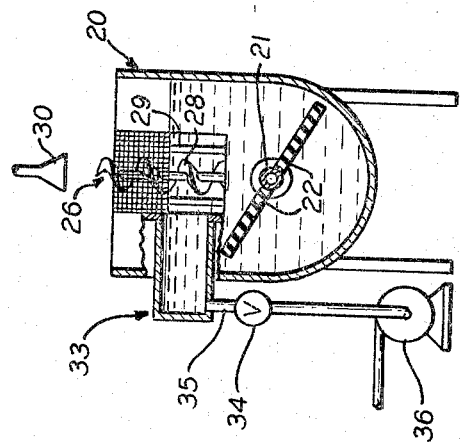
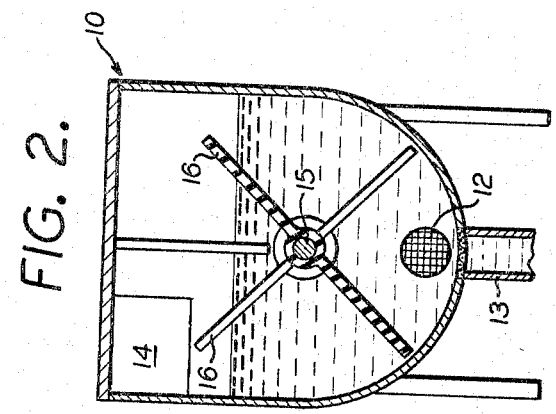
INVENTOR
HAROLD F. SNOW
BY
John L. Sigalos
ATTORNEY.

United States Patent Office 3,322,173
Patented May 30, 1967

3,322,173
APPARATUS FOR WASHING AND PEELING FRUITS AND VEGETABLES
Harold F. Snow, Pine Point, Maine, assignor to The Borden Company, New York, N.Y., a corporation of New Jersey
Filed May 26, 1964, Ser. No. 370,196
3 Claims. (Cl. 146—47)

This invention relates to a method and apparatus for processing vegetables and fruit and has particular reference to a method and apparatus for removing the peels from heat and/or chemically treated potatoes and will be described in connection therewith.

Peeling of potatoes is the first important operation in their processing and is usually accomplished by the use of heat, chemicals, or abrasive action. Heat and chemical peeling, accomplished in lye, steam, brine, and flame peelers, results in a loosening of the peel from the adjoining surface layers of the potatoes to the extent that they may be removed by rubbing and working of the potatoes in the presence of large amounts of water.

The large amounts of water necessarily used present a problem of waste disposal. Potato wastes, such as solubles and peels, contain large amounts of organic matter and a very high biological oxygen demand (B.O.D.) making them unsuitable for elimination into streams, where they cause pollution, and into regular municipal sewage systems. Consequently, disposal of this waste water is a serious problem, requiring the use of expensive facilities by the potato processor to dispose of the large amounts of waste water and, in many cases, entailing the screening of the waste water to remove the coarser suspended potato matter. Removal of the soluble potato wastes to lower the B.O.D. of the waste water requires additional expensive equipment.

These difficulties are obviated by the present invention which provides a method and apparatus for the countercurrent washing of potatoes eliminating the need for large volumes of water to remove the peels from heat and/or chemically peeled potatoes.

Briefly stated, the invention comprises the herein described process and apparatus for agitating and kneading the mass of potatoes and moving them in a path countercurrent to the flow of the wash water, in such manner as to remove the peels and concentrate the waste with minimal amounts of water.

The various features of the method and apparatus of the invention will become apparent from the following detailed description set forth in connection with the accompanying drawings which relate to a preferred embodiment of the present invention and are given by way of illustration.

FIG. 1 is a side view, partly in section, of the apparatus for completing removal of the peels from, and washing, potatoes and delivering them for subsequent processing;

FIG. 2 is a sectional view on line 2—2 of FIG. 1; and

FIG. 3 is a sectional view on line 3—3 of FIG. 1, with a portion broken away to show the sump.

Parts not shown in detailed are conventional.

There are shown an initial wash container 10 and an endless conveyor 11 for delivering the heat and/or chemically treated potatoes to the container 10. Other conventional carrying means may be employed to deliver the treated potatoes to the container 10.

The container 10 includes a wash water inlet 12, sump 13, and spillway 14. A shaft extends through the container 10 and has removably affixed thereto resilient mixing elements 16. Conventional drive mechanism 17 rotates the shaft and attached mixing elements 16. Affixed to the top of the container 10 are stators 32.

The sump 13, connected by means of conduit 18 to a positive pump 19, acts to remove wash water from the container 10 at a predetermined rate as described later herein.

Spillway 14 acts to convey the potatoes to secondary wash tank 20. A rotatably shaft 21 extends through the tank 20 and is provided with conveying elements 22. A conventional drive mechanism 23 is used to rotate shaft 21. Tank 20 includes a water outlet 24 which is connected to the wash water inlet 12 of container 10 by conduit 25.

An inclined helical drive 26 extends from the tank 20 to a conveyor belt 27 disposed above the tank 20. The helical drive includes a worm 28 and seated in a U-shaped trough 29. Positioned above the helical drive are water sprays 30 and 31 which act to spray water on the potatoes as they are removed from tank 20 to conveyor belt 27.

A side sump 33 is placed at the side of the tank 20 and is connected to a valve 34. Piping 35 connects valve 34 to a pump 36 which pumps the water to a conventional dewatering apparatus (not shown) such as a centrifuge.

From conveyor belt 27 the potatoes are moved to other apparatus (not shown) for further processing.

The materials of construction of the various parts of the apparatus are those that are used for like parts in apparatus of this general type, except as noted to the contrary.

Suitable materials for the major structural parts are steel, stainless steel, tinned iron or steel, or Monel metal. The resilient mixing means 16 are formed of suitable natural or GRS rubber or neoprene.

Dimensions of the various parts are varied in accordance with the output desired. For commercial production in removing peel and waste of 12,000 pounds of potatoes per hour a container 8'6" long and 3 feet high is used. Secondary wash tank is 12 feet long and 2 feet high. The resilient mixing elements 16 are 7 inches wide, 12 inches long and 1 inch thick; being about 30 Durometer in strength.

The screw 28 of the helical drive is of a size sufficient to lift the potatoes from the wash tank 20. In commercial practice a 10 inch screw is used.

The operation of the apparatus and the process will be largely evident from the description that has been given.

The heat and/or chemically treated potatoes are delivered by conveyor 11 to container 10. Shaft 15 and resilient mixing means 16 are rotated at high speed, about 120 r.p.m., to vigorously agitate the potatoes so that they strike one another, the walls of the container 10, and the resilient mixing means 16, and the stators 32. The result is a kneading and abrading action which removes any adherent peel from the potato. As set forth later herein the speed of the shaft is correlated to the potato solid concentration of the wash water in the container 10.

The potatoes move from the delivery end of the container 10 to spillway 14 where they fall into the secondary wash tank 20. Here the shaft 21 and attached conveying means 22 need only be rotated at a speed sufficient to move the potatoes to helical drive 26.

In wash tank 20 any adherent peels not taken off in container 10 are removed and the potato is thoroughly washed.

As the potatoes are lifted by helical drive 26 they are exposed to a final water rinse from sprays 30 and 31. This water spray is a source of water to the washing system and acts as a final cleaning of the potatoes.

The inclined helical drive 26 delivers the potatoes to conveyor 27 and thence on to further processing.

The side sump 33 acts to control the level of the water in the tank and vat. Regulation of the valve 34 will increase or decrease the rate of flow out of the sump thereby adjusting the height of water. The centrifugal pump forces the water to a centrifuge (not shown) which separates any wastes from the water, and the water is returned to the sprays 30 and 31.

The flow of wash water is counter-current to the movement of the potatoes. Wash water is added to the apparatus via sprays 30 and 31. It spills down helical drive 26 and into wash tank 20. Conduit means 25 carry the water into container 10 from which it is removed through sump 14 and conduit 18 by positive pump 19. It will be obvious that the flow of the water will be in the direction noted due to the action of the positive pump.

Thus, you get a progressively lower dilution of suspended matter and solubles as the potatoes move to the helical drive, resulting in a cleaner potato. The violent agitation of the potatoes in the container 10 in wash water of the highest percentage potato solids results in effective peel removal and washing with minimal amounts of water. Whereas conventional spray washing to accomplish peel removal requires about 200 to 300 gallons of water at 80 to 125 pounds pressure for 200 pounds of potatoes, the instant process requires only 3 to 5 gallons of water for a like amount of potatoes.

The side sump acts to regulate the amount of water in the system as described. This is necessary since it is particularly desirable to operate positive pump 19 to remove wash water from container 10 when it has a potato solids content of about 8% to about 14%. This results in the use of less wash water. Thus, by regulation of the level of water the waste solids content is regulated insuring maximum concentration of wastes removed through sump 13 with a minimum of water.

As previously noted care must be taken in regulation of the speed of shaft in container 10. The efficiency of peel removal depends in part upon the degree of agitation and kneading brought about by the action of the rotating shaft and resilient mixing means attached thereto. However, too violent an agitation is undesirable due to the fact that the high content of potato solids in the wash water makes it very viscous and capable of entrapping large amounts of air. Such air will be drawn into the sump and into the pump causing removal of varying amounts of wash water. This results in difficulty in maintaining the desired level of wash water in the container and wash tank.

It will be evident that the herein described invention can be used to clean other vegetables and fruit.

It will be understood that it is intended to cover all changes and modifications of the examples of the invention herein chosen for the purpose of illustration which do not constitute departures from the spirit and scope of the invention.

What is claimed is:

1. Apparatus for the counter-current washing of vegetables and fruit products, comprising a tank having inlet an doutlet ports, resiliently yieldable panels mounted on a rotatable shaft set in the tank and extending therethrough, a vat having a receiving section and discharging section, means connecting the said outlet port with said receiving section for conveying the products from said tank to the said vat, resiliently yieldable vanes mounted on a shaft extending through said vat, means positioned at said discharge section of said vat for removing the products from the vat, means positioned over the said removal means to spray water onto the products, and a sump in said tank connected to pumping means acting to remove wash water from said tank and cause the water to flow counter-current to the movement of the products.

2. Apparatus according to claim 1 in which the means for removing the potatoes from the discharge section of the vat comprises an inclined helical drive.

3. Apparatus according to claim 1 in which said vat has a sump attached to a side thereof, and a centrifugal pump connected to said sump for removing water from the vat in order to maintain the level of water in said vat in said tank at a predetermined level.

References Cited

UNITED STATES PATENTS

| 1,257,574 | 2/1918 | Bisceglia | 134—74 |
| 1,387,257 | 8/1921 | Groner | 15—3.15 |
| 2,846,704 | 8/1958 | Bella | 15—3.15 |

WILLIAM W. DYER, Jr., *Primary Examiner.*

W. GRAYDON ABERCROMBIE, *Examiner.*